No. 775,369. Patented November 22, 1904.

UNITED STATES PATENT OFFICE.

MAX KUGEL, OF WIESDORF, NEAR COLOGNE, GERMANY, ASSIGNOR TO FARBENFABRIKEN OF ELBERFELD CO., OF NEW YORK, N. Y.

GREEN-BLUE ANTHRAQUINONE DYE.

SPECIFICATION forming part of Letters Patent No. 775,369, dated November 22, 1904.

Application filed July 30, 1904. Serial No. 218,877. (No specimens.)

*To all whom it may concern:*

Be it known that I, MAX KUGEL, doctor of philosophy, chemist, residing at Wiesdorf, near Cologne, Germany, (assignor to the FARBENFABRIKEN OF ELBERFELD CO., of New York,) have invented a new and useful Improvement in Anthraquinone Dyes; and I hereby declare the following to be a clear and exact description of my invention.

My invention relates to the manufacture of a new dyestuff, being a hydroazin derivative of the anthracene series. The process for producing this coloring-matter consists in heating the 1-3-dibromo-2-amidoanthraquinone with cupric chlorid in the presence of a suitable dissolving or diluting agent and preferably with the addition of a product having a weak alkaline reaction, such as sodium acetate or the like. The reaction proceeds most probably according to the following equation:

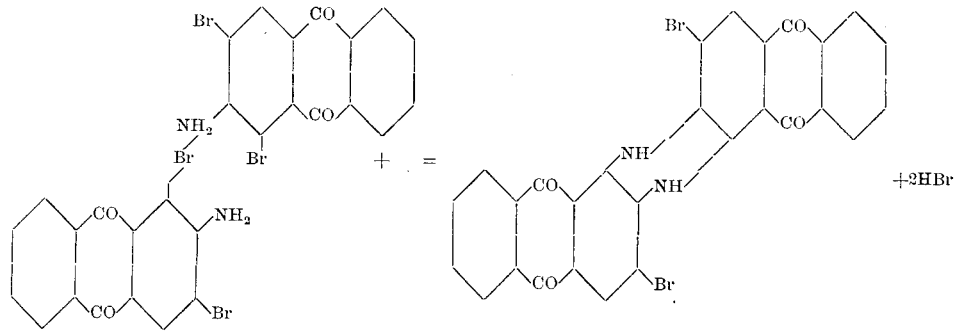

In carrying out the process practically I can proceed as follows, the parts being by weight: a mixture of twenty parts of 1-3-dibromo-2-amidoanthraquinone, two hundred parts of nitrobenzene, ten parts of pulverized anhydrous sodium acetate, and one-half part of cupric chlorid ($CuCl_2$) is heated to boiling for about five hours while stirring. When the mass has cooled down to 130° centigrade, the blue needles thus obtained are filtered off, washed with nitrobenzene, alcohol, and hot water.

My new coloring-matter thus obtained is a homogeneous product representing blue needles. It is soluble in hot nitrobenzene and anilin with a greenish-blue color and soluble in concentrated sulfuric acid with an olive-brown color. Upon treatment with hydrosulfite and caustic-soda lye it is transformed into its hydro compound, the alkaline solution of which has the properties of a "vat" suitable for dyeing and printing unmordanted cotton, pure greenish-blue fast shades being thus obtained.

Having now described my invention and in what manner the same is to be performed, what I claim as new, and desire to secure by Letters Patent, is—

The herein-described new dyestuff being a hydroazin derivative of the anthracene series obtainable by heating 1-3-dibromo-2-amidoanthraquinone with cupric chlorid and a suitable liquid, which dyestuff represents blue needles soluble in hot nitrobenzene and anilin with a greenish-blue and soluble in concentrated sulfuric acid with an olive-brown color; being transformed into a hydro compound on suitable reduction with hydrosulfite and caustic-soda lye, the alkaline solution thus obtained exhibiting the typical properties of a "vat" which dyes unmordanted cotton pure greenish-blue shades, substantially as hereinbefore described.

In testimony whereof I have signed my name in the presence of two subscribing witnesses.

MAX KUGEL.

Witnesses:
J. A. RITTERSHAUS,
ALBERT HEMSING.